E. L. WHITEHALL.
TWO WHEELED MOTOR CAR.
APPLICATION FILED OCT. 2, 1916.
1,235,747.
Patented Aug. 7, 1917.
3 SHEETS—SHEET 1.
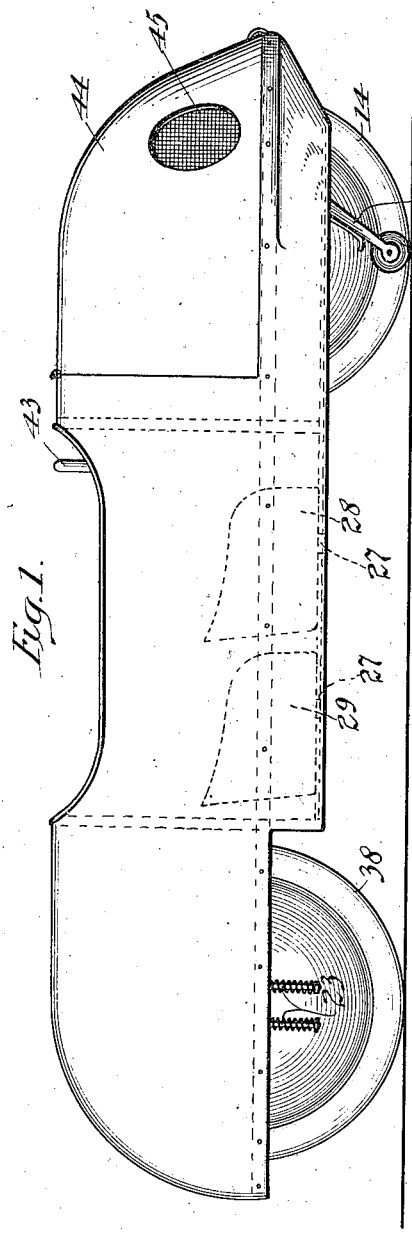
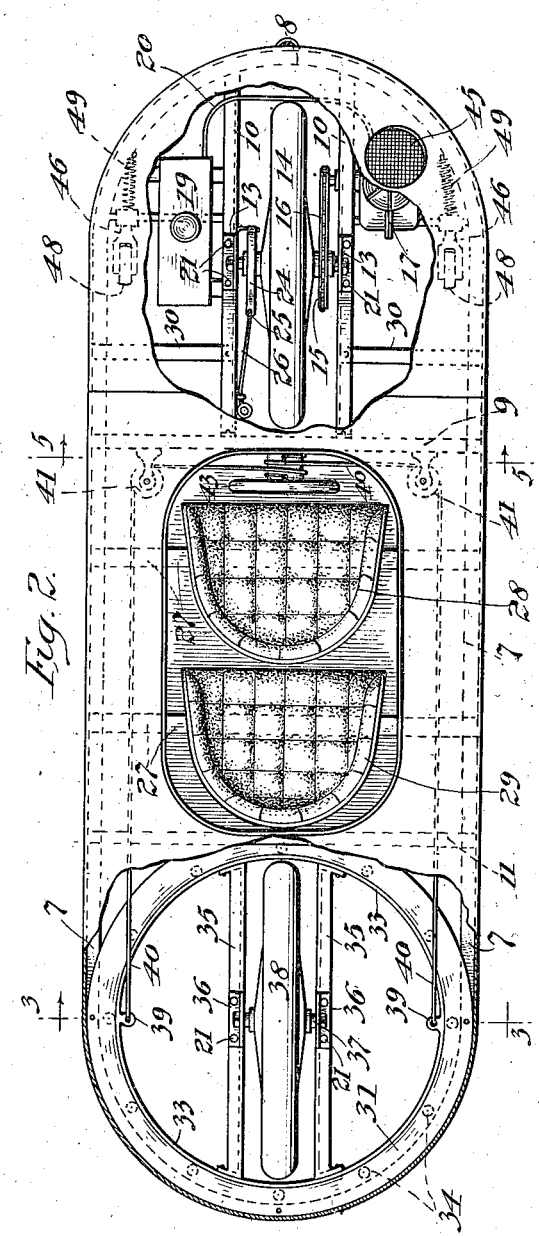

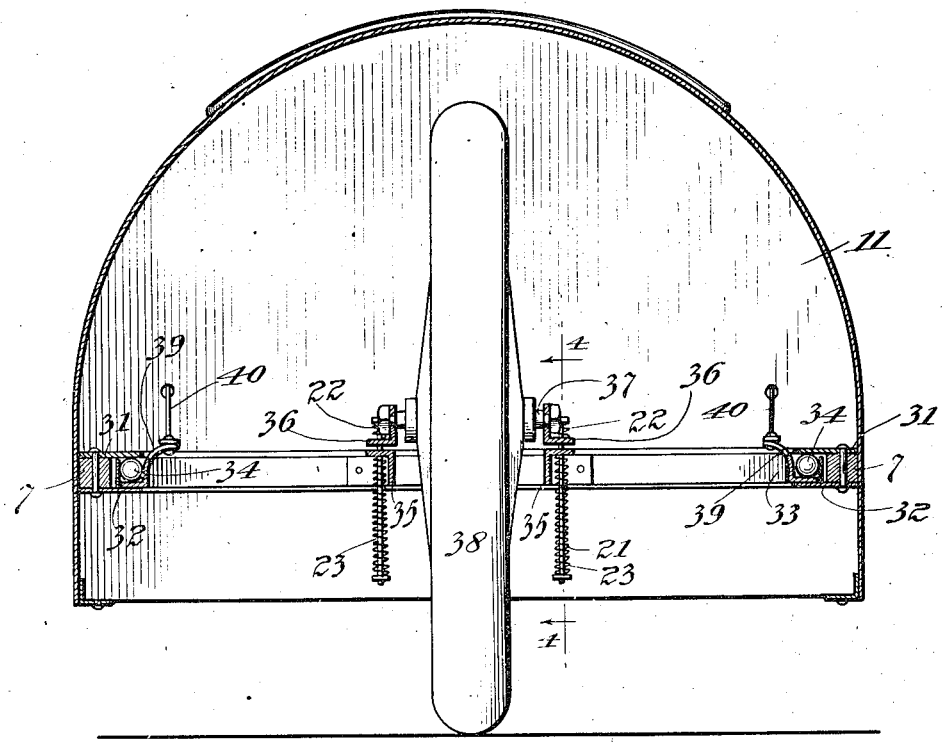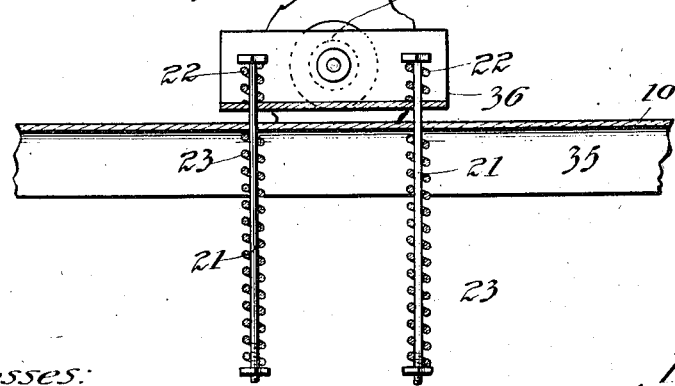

E. L. WHITEHALL.
TWO WHEELED MOTOR CAR.
APPLICATION FILED OCT. 2, 1916.
1,235,747.
Patented Aug. 7, 1917.
3 SHEETS—SHEET 3.
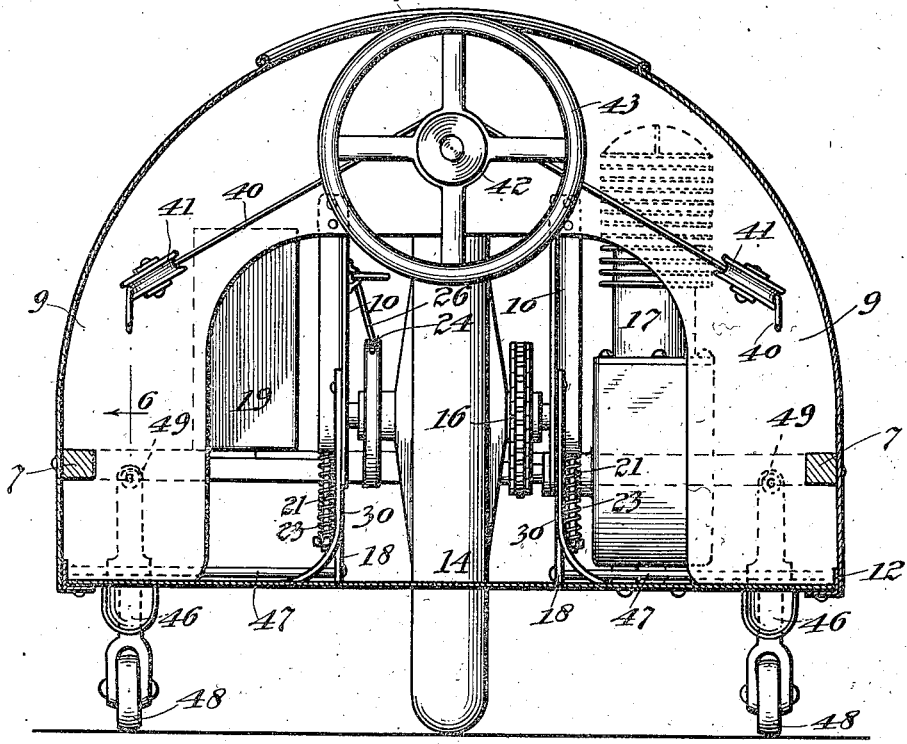
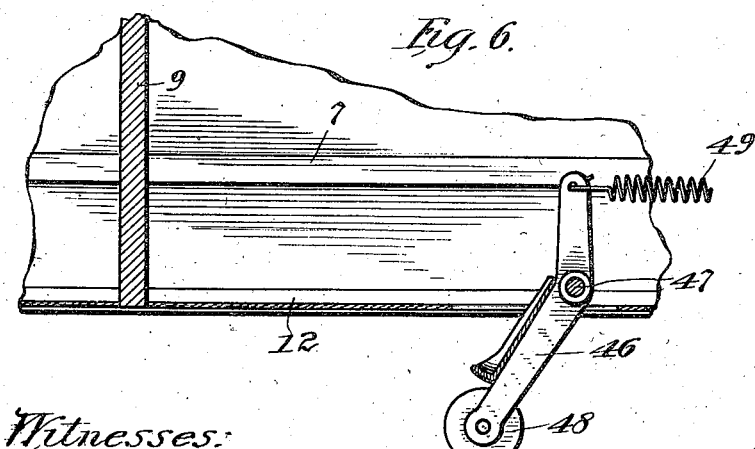
Witnesses:
Inventor:
Earle L. Whitehall

UNITED STATES PATENT OFFICE.

EARLE L. WHITEHALL, OF DENVER, COLORADO.

TWO-WHEELED MOTOR-CAR.

1,235,747.   Specification of Letters Patent.   Patented Aug. 7, 1917.

Application filed October 2, 1916. Serial No. 123,234.

*To all whom it may concern:*

Be it known that I, EARLE L. WHITEHALL, a citizen of the United States, residing at Denver, in the county of Denver and State of Colorado, have invented new and useful Improvements in Two-Wheeled Motor-Cars, of which the following is a full, clear, and exact description.

My invention relates to a two-wheeled motor car, and particularly to a car the wheels of which are arranged in tandem and which depends upon its momentum to maintain its upright position while in motion.

The objects of my invention are to increase the stability, resiliency and comfort of a car of this character by increasing the wheel-base and by lowering the center of gravity of the car and its load, and by applying the propelling power to the front wheel and steering the car by the rear wheels, and to provide simple means to keep the car upright when stationary. These objects and the novel construction that enables me to accomplish the same are hereinafter fully described, and particularly pointed out in the claims.

In the drawings:

Figure 1 is a side elevation of my invention.

Fig. 2 is a plan view of the same showing portions of the outer shell of the body broken away to expose the chassis, the motor and driving mechanism.

Fig. 3 is a transverse section taken on dotted line 3—3, Fig. 2, drawn to a slightly larger scale.

Fig. 4 is a vertical longitudinal section of a fragment of the car taken on dotted line 4—4, Fig. 3, drawn to a larger scale.

Fig. 5 is a transverse section taken on dotted line 5—5, Fig. 2, drawn to a larger scale.

Fig. 6 is a longitudinal vertical section of a fragment of the car showing a side view of one of the stabilizers.

As shown in the drawings, the chassis of the car comprises parallel side-sills 7, 7, and rounded end-sills 8, 8, that merge into the side-sills and form continuations thereof. About one-third of the length of the car back from its front end I connect the side-sills by a transverse dash-board 9 the central portion of the underside of which is cut-away, as shown in Fig. 5 of the drawings, so that it forms an arch from one side-sill to the other. The end-sills 8 are connected to said dash-board by parallel reaches 10 that extend horizontally back from the end-sills to the vertical plane of the dash-board and then extend vertically upward and are secured to the arch of said dash-board, substantially as shown. About one-half the distance between dash-board 9 and the rear end of the car, side-sills 7 are connected by a partition 11, the upper edges of which, as well as the upper edges of the dash-board, are curved so as to describe a semi-circle, and the outer shell 12, which is, preferably, made of sheet metal, and which is of the shape shown in the drawings, is secured to the side and end sills and to the upper edges of partition 11 and dash-board 9 to obtain the desired shape of the exterior of the body of the car. The lower edges of shell 12 between partition 11 and the front end of the car extend, preferably, down below sills 7 and 8, and at the front of the car are inclined in under the body thereof, substantially as shown in Fig. 1 of the drawings.

About midway between arch 9 and the front of the car, reaches 10, 10, are provided with suitable bearings 13, 13, in which the transverse axle of the forward wheel 14 is journaled. This front axle is driven through the medium of a sprocket-wheel 15 mounted thereon and a chain 16 by a suitable motor 17, which latter is supported by transverse cross-bars underneath it that connect the sides of shell 12 below sills 7 and 8, and a hanger 18 that is secured to and depends down from reach 10. This motor is supplied with gasolene from a tank 19 supported by a suitable horizontally disposed frame-work connecting reach 10 and the sills of the car on the other side of wheel 14, by means of a suitable pipe 20.

In order to provide the necessary resiliency for the body of the car, I prefer to support bearings 13 slightly above reaches 10 by mounting the same upon vertical bolts 21 which are surrounded by springs 22 between the heads on the upper ends thereof and the supporting-plate of the bearings, and by springs 23 that surround the longer lower portions of said bolts extending down through suitable openings in reaches 10, between said supporting-plate, and nuts and washers on the lower ends thereof, substantially as shown. This arrangement of springs will provide the necessary resiliency for the front end of the body of the car, although, it is obvious, other means for accomplishing this object may be employed, if desired.

The hub of wheel 14 adjacent the gasolene tank 19, is provided with a suitable disk 24, and this disk is engaged by a suitable brake element 25, which latter has a rod 26 extending rearwardly through the arched dash-board and has a suitable hand-grasp on its rear end for the convenience of the driver when he desires to slow up the travel of the car or to stop the same.

The upper portion of the central part of shell 12 between the arched dash-board and partition 11 is cut away, substantially as shown in Figs. 1 and 2, to form a cock-pit, as it were, and the lower edges of the shell between said dash-board and partition are connected by a suitable floor. This floor is provided with cross-bars 27, 27, whose ends are connected to and supported in any desirable manner by the shell, and these cross-bars support seats 28 and 29, which are arranged in tandem, one behind the other, substantially as shown. The passengers of the car seat themselves in said cock-pit, and the legs of the occupant of the front seat (or driver) extend under the arch of the dash-board, and when the car is in motion his feet rest on the foot-rests 30, which latter consist of metal strips that have their upper vertical portions secured to reaches 10 and the outer ends of their lower horizontal portions secured to the horizontal edges of shell 12, which latter may, if desired, be reinforced by an angle-iron or other suitable wooden or metal construction.

The upper and lower surfaces of the sills of the body of the car at the rear of partition 11 have annular plates 31 and 32 secured thereto, which are of such width and diameter that their inner edges project toward the center beyond the inner sides of the sills and provide run-ways for a rotatable channel-shaped circular frame 33. Ball-bearings 34 are inserted in the channel of this frame, and are of such size that the under surface of the inner projecting portion of the upper annular plate 31 bears upon the same, and thus supports the rear portion of the body of the car. This frame 33 is provided with two parallel center-sills 35, the ends of which are connected to the inner circumferential surfaces of the same at points substantially opposite each other, and midway between their ends these sills 35 are provided with bearings 36 for the journal of the axle 37 of the rear wheel 38 by which the car is steered. These bearings are, preferably, supported by springs and bolts, constructed in substantially the same manner as bolts 21 and springs 22 and 23, and perform similar functions.

In order to steer the car, the inner circumference of circular-frame 33, at points alining with the axis of wheel 38 and diametrically opposite each other, is provided with lugs 39 to which the rear ends of a cable 40 are secured. This cable 40 extends forward from lugs 39 through suitable guide-openings in partition 11 to dash-board 9 and are then directed by concaved sheaves 41 to and around the barrel 42 of a steering-wheel 43, which latter is suitably journaled in the center of the arch of the dash-board within convenient reach of the driver of the car when seated in front seat 28.

Motor 17 is started in the same manner as the motors of motor-cars now in extensive use, and in order to provide access to the motor and to the gasolene tank, the front part of the shell or hood 44, which is of the shape shown in Fig. 1, and is hinged at the uppermost point of its rear edge to the shell of the car back of it, can be lifted up. This type of hood is known as the "French hood", and is held down by means of a suitable catch at its front end and is provided with a screened opening 45 in front of the motor to supply the necessary air to keep said motor cool.

In order to keep my improved car upright when stationary, I have provided the same with stabilizers 46 which consist of an obtuse angle-shaped leg. These stabilizers are pivotally mounted at their angles upon transverse stationary shafts 47, which latter have their ends suitably secured in bearings secured to the inner side of the lower edges of shell 12 and hangers 18. The lower branch of these stabilizers are each provided with a roller 48 journaled in their lower ends, that are adapted, when the stabilizers are pushed down by the pressure of the foot against the rear edge of said lower branch, to travel or rest on the ground. The upper end of the upper or shorter branch of these stabilizers is connected by means of a contracting spring 49 to the end-sills and normally keeps the stabilizers in such position that roller 48 will be off the ground. When traveling around a corner the driver can press the stabilizer on the side nearest the direction in which the car is turning downward, and thus prevent too much of an inclination of the car, and keep the car in a substantially level position. Of course, the driver can drop his feet to the ground when he wishes to thus guide or to stop the car, but this, ordinarily, is inadvisable.

It will be noticed that the distance between the bases of the wheels is considerably more than it is usually possible to obtain in two-wheeled cars of this character, and it will also be observed that my improved construction permits the center of gravity of the car and its load to come below the axes of the wheels. These unique features and the further fact that the car is driven from the front wheel and steered by the rear wheel makes it a very easy and comfortable car in which to ride.

What I claim as new:

1. A motor car of the kind described, comprising side-sills and end-sills, a dash-board and a transverse partition connecting the same, reaches connecting one end-sill and said dash-board, a wheel the journals of the axle of which are supported by said reaches, a single steering wheel, and rotatable means between the partition and the opposite end-sill in which said steering wheel is journaled.

2. A motor car of the kind described, comprising side-sills and end-sills, a dash-board and a transverse partition connecting the same, reaches connecting one end-sill and said dash-board, a wheel the journals of the axle of which are supported by said reaches, a single steering wheel, and a rotatable horizontally disposed circular frame between the partition and the opposite end-sill in which said steering-wheel is journaled.

3. A motor car of the kind described, comprising side-sills and end-sills, an arched dash-board, and a transverse partition connecting the same, parallel reaches extending from the front endsill rearwardly to said dashboard and connected thereto, bearings supported by said reaches, a wheel the axle of which is journaled in said bearings, a motor on one side of said wheel and geared thereto, and a gasolene tank on the other side thereof, a horizontally rotatable frame between said partition and rear end-sill, and a steering wheel journaled therein.

4. A motor car of the kind described comprising side-sills and end-sills, an arched dash-board, and a transverse partition connecting the same, parallel reaches extending from the front end-sill rearwardly to said dash-board and connected thereto, bearings supported by said reaches, a wheel the axle of which is journaled in said bearings, a motor on one side of said wheel and geared thereto, and a gasolene tank on the other side thereof, a horizontally rotatable frame between said partition and rear end-sill, parallel members the ends of which are connected to the inner circumference of the same diametrically opposite each other, and a steering wheel journaled therein.

5. A motor car of the kind described comprising side-sills and end-sills, an arched dash-board and a transverse partition connecting the same, parallel reaches extending from the front end-sills and dash-board, a drive-wheel journaled between the same, a horizontally disposed annular runway secured between said partition and rear end-sill, a circular frame seated and rotatable in said runway, parallel members the ends of which are connected to the inner circumference of said circular frame at points substantially opposite each other, and a wheel supported between said parallel members.

6. A motor car of the kind described comprising side-sills and end-sills, an arched dash-board and a transverse partition connecting the same, parallel reaches extending from the front end-sills and dash-board, a drive-wheel journaled between the same, a horizontally disposed annular runway secured between said partition and rear end-sill, a circular frame which is U-shaped in cross-section seated and rotatable in said runway, bearing-balls in the channel of said circular frame that engage the underside of the top of said runway, parallel members the ends of which are connected to the inner circumference of said circular frame at points substantially opposite each other, and a wheel supported between said parallel members.

7. A motor car of the kind described comprising side-sills and end-sills, an arched dash-board and a transverse partition connecting the same, parallel reaches extending from the front end-sills and dash-board, a drive-wheel journaled between the same, a horizontally disposed annular runway consisting of annular plates secured to said partition and rear end-sill, a circular frame which is U-shaped in cross-section seated and rotatable in said runway, bearing-balls in the channel of said circular frame that engage the underside of the top of said runway, parallel members the ends of which are connected to the inner circumference of said circular frame at points substantially opposite each other, and a wheel supported between said parallel members.

8. A motor car of the kind described comprising side-sills and rounded end-sills, an arched dash-board, and a transverse partition connecting the same having their upper edges curved, and a shell connected to and supported by said sills and partition and dash-board and having an opening therein between the latter, parallel reaches extending from the front end-sill rearwardly to said dash-board and connected thereto, bearings supported by said reaches, a wheel the axle of which is journaled in said bearings, a motor on one side of said wheel and geared thereto, and a gasolene tank on the other side thereof, a horizontally rotatable frame between said partition and rear end-sill, and a steering wheel journaled therein.

9. A motor car of the kind specified comprising a suitable chassis which is supported by a front wheel whose axis is fixed, and a rear wheel that is adapted to be turned laterally to steer the car; the frame of said chassis being disposed in the horizontal plane of the axes of said wheels, and suitable seats supported by said frame between and below the top segments of said wheels.

10. A motor car of the kind specified comprising side-sills and end-sills, a dash-board, and a transverse partition connecting said side-sills, longitudinal reaches connecting the front end-sill and dash-board, a front drive-wheel the axis of which is supported by said reaches, a rear steering wheel, and a horizontally rotatable frame supported by the side-sill, rear end-sill back of said partition, suitable cross-frames connecting said side-sills between the dash-board and partition, and seats supported by said cross-frames.

In witness whereof I have hereunto set my hand this 28th day of September, 1916.

EARLE L. WHITEHALL.

Witnesses:
FRANK D. THOMASON,
FLORENCE MITCHELL.